Oct. 4, 1938.  F. P. PERKINS  2,131,816
CONVEYING MACHINERY
Filed Sept. 1, 1933   3 Sheets-Sheet 1
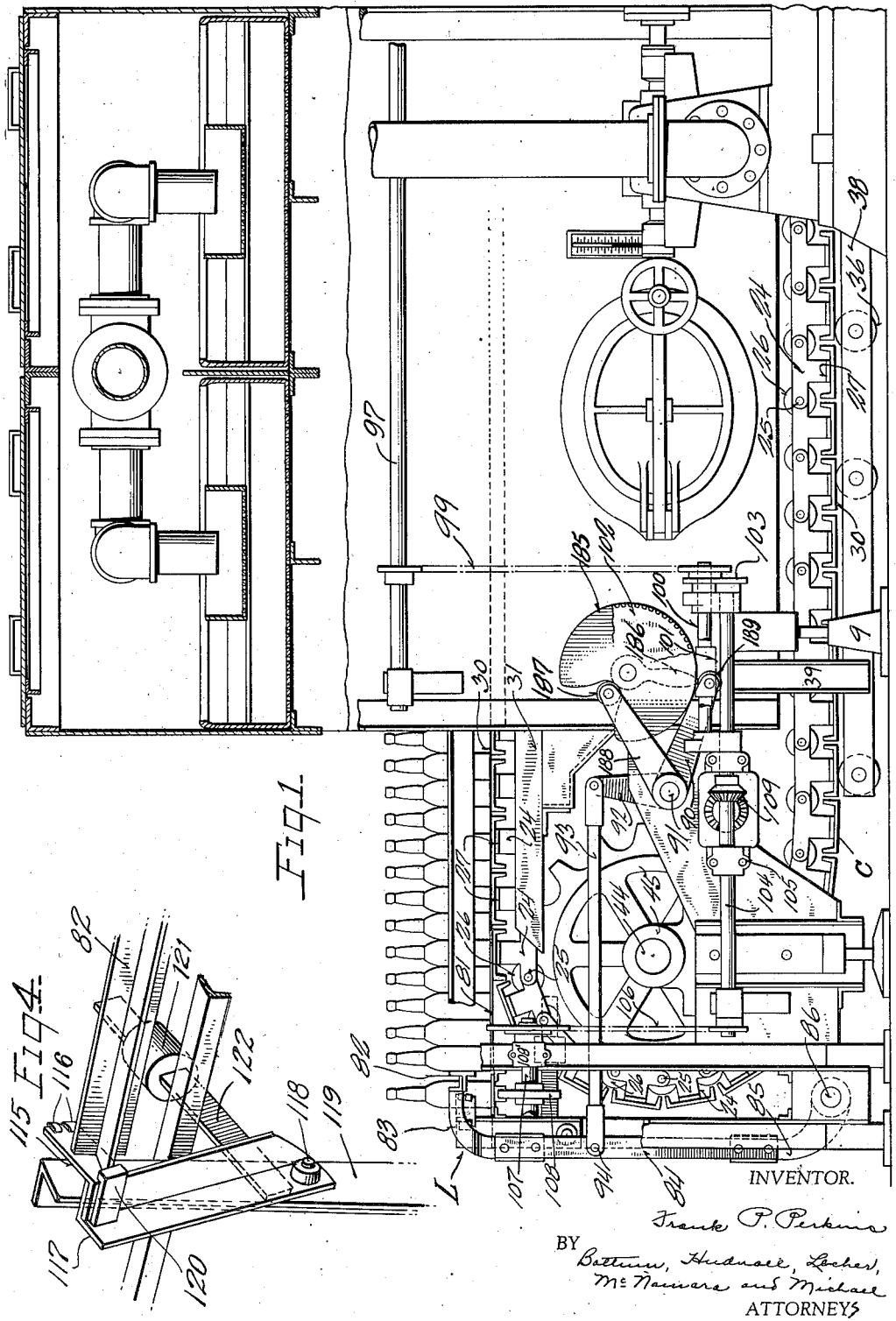
INVENTOR.
Frank P. Perkins
BY Bottum, Hudnall, Locher,
McNamara and Michael
ATTORNEYS

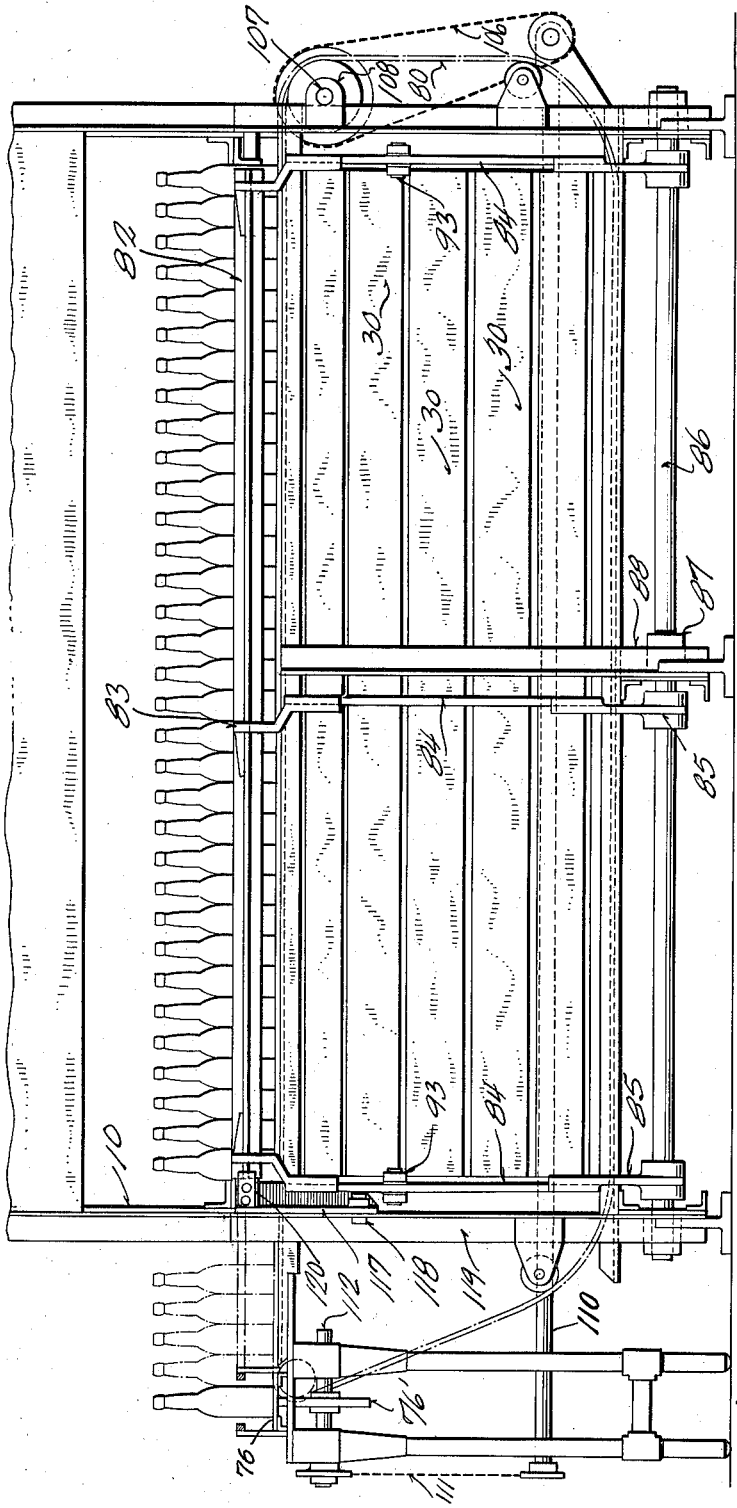

Oct. 4, 1938.　　　F. P. PERKINS　　　2,131,816
CONVEYING MACHINERY
Filed Sept. 1, 1933　　　3 Sheets-Sheet 3
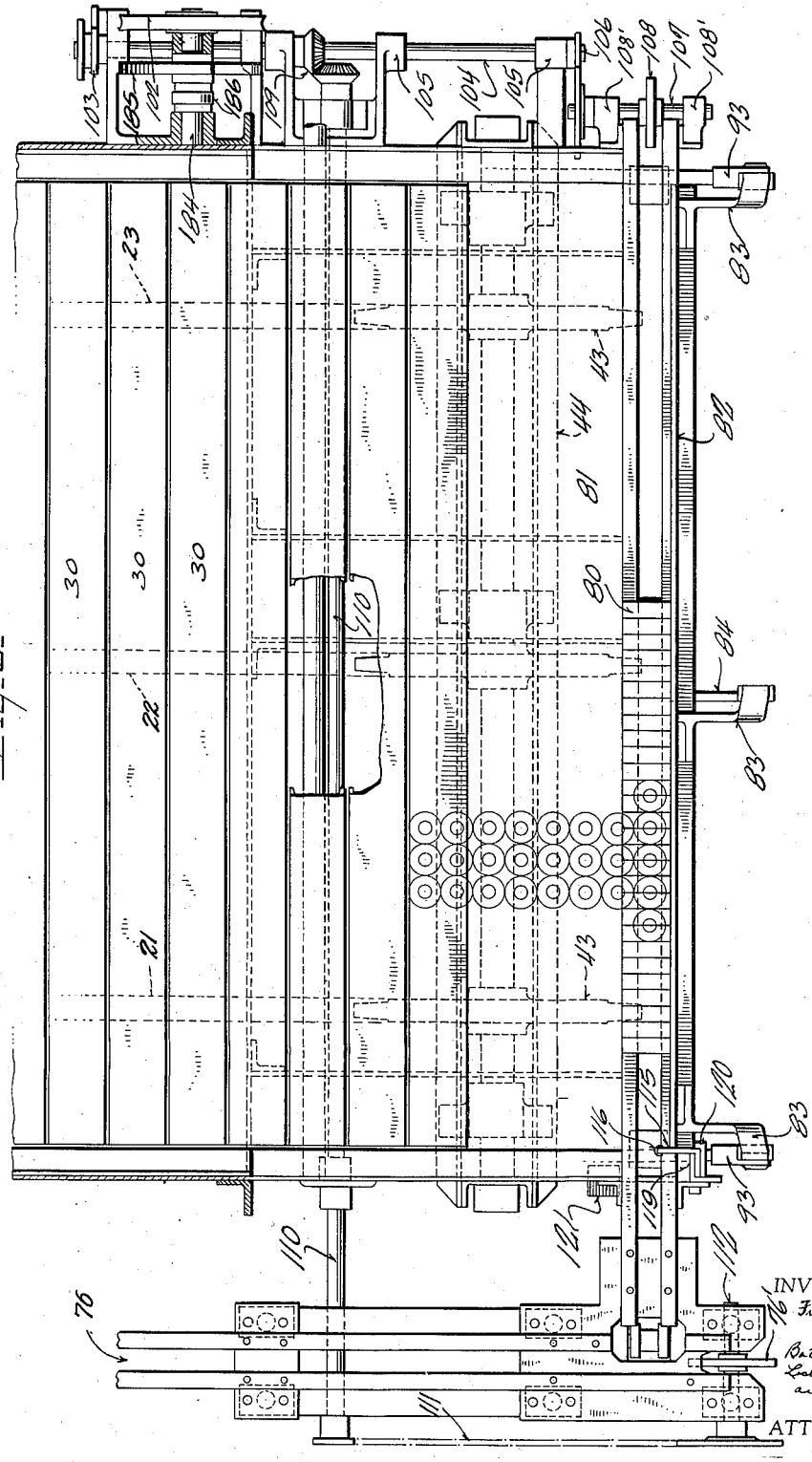

Patented Oct. 4, 1938

2,131,816

UNITED STATES PATENT OFFICE 2,131,816

CONVEYING MACHINERY

Frank P. Perkins, Waukesha, Wis., assignor to Michael Yundt Company, Waukesha, Wis., a corporation of Wisconsin Application September 1, 1933, Serial No. 687,814

2 Claims. (Cl. 198—31)

This invention relates in general to conveying machinery especially designed and adapted for pasteurizing bottled beer or other bottled liquids and is concerned more particularly with the mechanism for loading such a machine.

An object of the invention is to provide a machine of this character with means for feeding the bottles to the machine automatically and in such manner as to utilize the full capacity of the machine and this while maintaining the bottles in an upright position.

In the machine embodying the present invention the bottles being fed to the machine are automatically arranged in row formation while in upright position and are then fed to and through the machine while in such formation and position.

Other objects and advantages reside in certain novel features of the construction, arrangement and combination of parts which will be hereinafter more fully described and particularly pointed out in the appended claims, reference being had to the accompanying drawings, forming a part of this specification, and in which:

Figure 1 is a fragmentary view on a somewhat enlarged scale and illustrating the loading mechanism in side elevation and certain of the elements of the conveying apparatus partly in longitudinal vertical section and partly in elevation;

Figure 2 is a fragmentary view in end elevation and further illustrating the mechanism at the loading end of the machine;

Figure 3 is a fragmentary plan view further illustrating the parts shown in Figure 2, certain parts omitted and others being illustrated in section for the sake of illustration;

Figure 4 is a fragmentary perspective view illustrating the bottle stop employed at the loading end of the machine.

Referring to the drawings, it will be seen that the machine embodying the present invention comprises generally a main conveyor C and loading mechanism L located at one end of the machine for automatically loading bottles onto the main conveyor C.

The main conveyor C is of the endless type and has its upper run horizontally disposed.

As illustrated the conveyor C is made up of three double endless chains designated at 21, 22 and 23. These endless chains are identical construction and the members of each double chain are also identical. Each endless chain consists of T-shaped links 24, the adjacent ends of the cross members of the T-shaped links being pivotally connected together by a pivot pin 25.

Each pivot pin 25 also serves as a pintle or axle for a roller 26 rotatably mounted thereon and disposed between the member chains of each double chain. The legs of the T-shaped links are outwardly flanged as indicated at 27 and the flanges of the laterally alined links of the several chains are welded to cross channels 30 which make up the belt or carrying apron of the conveyor. The arrangement is such that the cross channels in the upper run of the conveyor are inverted so that their side flanges project downwardly and as these side flanges are closely adjacent in this upper run the smooth body portions of the cross channels present a substantially continuous table-like surface.

The rollers 26 of the upper runs of the endless chains 21, 22 and 23 ride on rails 31. The rails 31 are parallel to each other and extend longitudinally of the machine.

The lower run of the conveyor C is supported by means of rollers 36 mounted on supporting bars 38 carried by vertical supporting channels 39.

The endless chains 21, 22 and 23 are trained over driving sprockets (not shown) and over idler sprockets 43 mounted on a shaft 44 rotatably amounted in bearings 45 provided at the loading end of the machine. There are, of course, three driving and three idler sprockets and the driving and idler sprockets are longitudinally alined. In other words, there is a pair of sprockets for each endless chain. The teeth of the sprocket coact with the rollers 26 in driving and controlling the chains.

The driving mechanism and driving sprockets are of standard construction and are not shown.

The bottles containing the beer or other liquid to be pasteurized are conveyed from a bottle filling and capping machine or a source of supply of such bottles to the conveyor by means of a feed conveyor of the type generally known to the art and diagrammatically illustrated at 76. From the feed conveyor the bottles are picked up by a row-forming conveyor 80.

The conveyor 80 is coplanar with and extends transversely with respect to the main conveyor adjacent the loading end thereof. The conveyor 80 has upper and lower runs and is so positioned with respect to the main conveyor C that the end thereof trained over the idler sprockets 43 is included within the upper and lower runs of conveyor 80. Between the upper run of the row-forming conveyor 80 and the main conveyor C is a smooth horizontally disposed bridge plate 81, which plate is suitably secured and fastened in fixed position and in proper relation to the row-forming and main conveyors. Because the upper and lower runs of row-forming conveyor 80 include therebetween the idler end of main conveyor C, the width of the plate 81 can be maintained at a minimum thus decreasing the distance over which the articles to be transferred have to pass under the operation of the transfer mechanism hereinafter described. As the conveyor is designed primarily for the transfer and handling of bottles this lessens the possibility of breakage.

Means is provided for transferring the rows of bottles formed on the conveyor 80 onto the bridge plate 81 in such manner that as each row of bottles is displaced from the conveyor 80 to the bridge plate 81 it advances or pushes ahead the row previously so transferred so that the rows of bottles are in this way moved across the bridge plate and onto the main conveyor. The means for transferring the row of bottles from the conveyor 80 to the bridge plate 81 comprises a horizontally disposed pusher 82 which parallels the outer edge of the conveyor 80 and consequently is disposed transversely to the bridge plate 81 and main conveyor C. This pusher bar 82 may be of T-shape in cross section but its face adjacent the conveyor 80 is smooth so as to adapt it to serve also as a guide for the bottles as the row is being formed on the conveyor 80. The horizontal flange of the T-shaped pusher is securely fastened to the curved upper ends 83 of rocker arms 84. Three such rocker arms 84 are provided and each has its curved lower end 85 mounted on a supporting shaft 86 mounted in bearings 87 carried by the adjacent frame-work 88 of the machine. The rocker arms 84 are periodically actuated to cause the pusher bar 82 to sweep across the conveyor 80 and push a row of bottles therefrom onto the bridge plate 81 and the action of the pusher bar in this respect in synchronized with the action of the conveyor 80 by proper synchronization of the actuating means for the pusher bar and the drive for the conveyor 80.

The actuating means for the pusher bar 82 comprises a cam shaft 184 having a disc-like cam 185 and a finger-like cam 186 fixed thereon, the cam 185 coacting with the laterally offset roller 187 of its follower lever 188 and the cam 186 coacting or having wiping engagement with the laterally offset roller 189 of its follower lever 90. The levers 188 and 90 are fixed to a cross shaft 91 supported for rocking movement in bearings provided therefor in the frame. Crank arms 92 are fixed to the shaft 91 to rotate therewith and are pivotally connected to connecting rods 93 which, in turn, are pivotally connected as at 94 to the rocker arms 84 located at the sides of the machine. The cam shaft 184 is driven from a countershaft 97 by chain and sprocket gearing 99 with a worm shaft 100. The worm 101 of the worm shaft 100 meshes with a worm wheel 102 fixed to the cam shaft 184.

The drive for the row-forming conveyor 80 is taken from the worm shaft 100, it being transmitted through intermeshing gears 103 to a jack shaft 104 supported for rotation in bearings 105 and connected by chain and sprocket gearing 106 with a short shaft 107 on which the driving sprocket 108 for the conveyor 80 is fixed. This shaft 107 is supported for rotation in bearings 108' mounted on the frame-work of the machine and is located under the bridge plate 81.

When the pusher bar 82 is actuated to transfer a row of bottles from the conveyor 80 to the bridge plate 81 it is desirable to prevent feed of the additional bottles along this conveyor 80 and for this purpose an automatic stop or barrier 115 shown to advantage in Figure 4 is provided adjacent one end of the pusher bar 82. This stop 115 may be in the form of an angle lug, one flange of which is provided with bottle engaging rollers 116 and the other flange of which is fastened to the upper end of an angle iron 117. The lower end of the angle iron 117 is freely pivoted as at 118 on a fixed standard 119 of the frame. When the pusher bar 82 is retracted, that is, is located along the outer edge of the conveyor 80 at which time the conveyor 80, when operating, is forming up a row of bottles, the stop 115 is held out of the path of movement of the bottles by virtue of the engagement of the pusher bar 82 with a lug 120 of the stop. When, however, the pusher bar moves across the conveyor 80 to transfer the bottles therefrom to the bridge plate, the stop 116 follows the pusher bar under the influence of a weight 121 mounted on an arm 122 connected with the angle iron 117. It is to be understood that this weight 122 simply illustrates one type of biasing means which may be utilized to cause the stop to follow the movements of the pusher bar. Obviously, a spring may be used in lieu of the weight or other biasing means may be employed.

While I have shown and described one machine embodying the present invention, it is to be understood that the particular machine shown has been selected for the purposes of illustration or example and that various changes in the size, shape and arrangement of the parts may be made without departing from the spirit of the invention or the scope of the subjoined claims.

The invention claimed is:

1. A machine having a main conveyor and means for loading bottles onto one end of said conveyor, a row-forming conveyor extending transversely of the main conveyor at one end of the machine, a bridge-plate between the row-forming conveyor and said main conveyor, a pusher bar for displacing a row of bottles from said row-forming conveyor onto said bridge-plate when the row is formed, and a barrier pivotally mounted on the machine and yieldably biased to swing into position across the row-forming conveyor, said barrier being adapted to be engaged by said bar and swung into inoperative position as said bar is retracted.

2. A machine having a main conveyor and means for loading bottles onto one end of said conveyor, a row-forming conveyor extending transversely of the main conveyor at one end of the machine, a bridge-plate between the row-forming conveyor and said main conveyor, a pusher bar for displacing a row of bottles from said row-forming conveyor onto said bridge plate when the row is formed, a barrier pivotally mounted on the machine and yieldably biased to swing into position across the row-forming conveyor when said pusher bar advances, and cooperating means operable directly between the pusher bar and said barrier for swinging the barrier to inoperative position when the pusher bar is retracted, said barrier having bottle engaging rollers to facilitate its movement across the row-forming conveyors.

FRANK P. PERKINS.